UNITED STATES PATENT OFFICE.

PETER C. REILLY, OF INDIANAPOLIS, INDIANA.

PRESERVED WOOD.

No. 899,904.  Specification of Letters Patent.  Patented Sept. 29, 1908.

Application filed August 31, 1905. Serial No. 276,622. (Specimens.)

*To all whom it may concern:*

Be it known that I, PETER C. REILLY, of Indianapolis, county of Marion, and State of Indiana, have invented a certain new and useful Preserved Wood; and I do hereby declare that the following is a full, clear, and exact description thereof, reference being had to the accompanying drawings, in which like letters refer to like parts.

My invention is an article of manufacture consisting of natural wood or wood fiber impregnated with a hydro-carbon oil derived from the destructive distillation of petroleum in the manufacture of oil or water gas. This oil is produced by the condensation of vapor which is unconsumed in the manufacture of oil or water gas. It is heavier than water, has a specific gravity of about 1.0725, begins to distil at about 150° C., is fluid at normal temperatures, is substantially non-volatile and antiseptic, and when used for the impregnation of wood may be driven deep into the pores of the wood uniformly, and will remain there permanently, and is not affected by any of the ordinary atmospheric changes or agencies.

The following is a description of the process for manufacturing this preservative, the material from which it is made and the nature of the product.

The apparatus consists of a cylindrical retort having an iron shell lined inside with fire clay and loosely filled with pieces of broken fire brick or like refractory material. One end of the retort is provided with an opening and appliances for heating the contents and also a suitably arranged spray pipe connected with a supply tank containing oil. The other end of the retort is provided with a sort of stack valve and a pipe connecting a condensing chamber and reservoir for the purpose of collecting such condensible matter and gas as may be produced by the process hereinafter described. The starting material must be a crude petroleum, or petroleum distillate, having a paraffin base.

In operation the temperature of the contents of the retort is raised to a cherry red heat, then a spray of the petroleum oil is injected into it and caused to pass up through the incandescent material. The heat transforms the constituents of the oil into fixed gases and condensible vapors. These gases and vapors are conducted into the cooling chamber, where the vapors are condensed, while the fixed gases pass on to the reservoir where they are stored. This condensed material, I find to be highly suited for preserving wood. The black oily liquid has a chemical composition differing widely from the homologous methane or paraffin series $(C_nH_{2n+2})$ to which the starting material belongs. This hydro-carbon oil or mixture of hydro-carbon oil has several characteristics by which it may be distinguished. It has a specific gravity of about 1.0725; it begins to distil at about 150° C.; it is fluid at normal temperatures; is substantially non-volatile and is antiseptic to the ordinary animal and vegetable organisms which would destroy wood fiber. It is also comparatively free of suspended matter, so that it may be used as a true oil is employed and is under almost all circumstances entirely fluid. Under proper conditions it will permeate the fiber of wood and have little or no matter in suspension; the pores of the wood will not be stopped, but will remain open, so that the oil may pass clear through the wood.

On account of the excessive severity of treatment to which the hydrocarbon compounds composing the starting material, are subjected, the paraffin series is decomposed, part forming permanent gases and part forming a liquid. The liquid consists of hydrocarbon compounds different from those which existed in the starting material, the atoms of the molecules of the paraffin series being so rearranged, through the agency of heat, that the compounds conform no longer to their original structure but to a mixed and varied number of hydrocarbon compounds possessing such chemical and physical properties as to make their product suited to my purpose. I find this black oily liquid contains not only qualities superior to the so called "creosote oils" but contains a substance which forms a firm cement about the wood fiber of the blocks, making it much more impervious to water and more resistant to surface wear than wood fiber treated with any one of the numerous preservative compounds or mixtures now so extensively used.

The liquid which I secure from the above described process may be used without further treatment, after freeing it by means of heat, from any moisture it may contain; or it may be subjected to heat so as to drive off some of the liquids of low boiling point, if any should exist, before it is employed for impregnating the wood fiber.

The above described product is driven into the pores of the natural wood in any suitable way, preferably by the employment of the usual methods for creosoting wood.

What I claim as my invention and desire to secure by Letters Patent is:

As an article of manufacture, wood impregnated with the hereinbefore described tar obtained in the manufacture of oil and water gas, said tar having a specific gravity greater than water, beginning to distil at about 150° C., being fluid at normal temperature and substantially non-volatile, practically free of matter in suspension and antiseptic to the organisms which attack wood.

In witness whereof, I have hereunto affixed my signature in the presence of the witnesses herein named.

PETER C. REILLY.

Witnesses:
V. H. LOCKWOOD,
N. ALLEMONG.